July 5, 1960
J. R. BONACCORSI ET AL
2,944,202
MULTI-PHASE SERVO SYSTEM
Filed Jan. 22, 1959
3 Sheets-Sheet 1
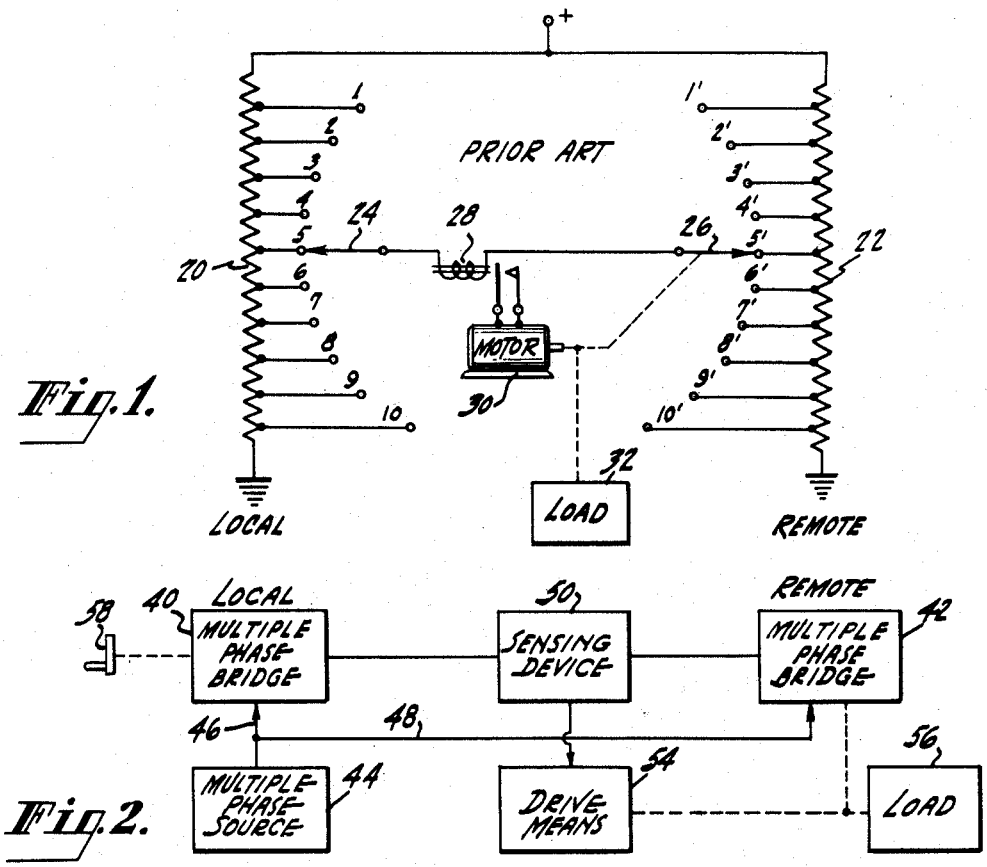
Fig.1.
Fig.2.
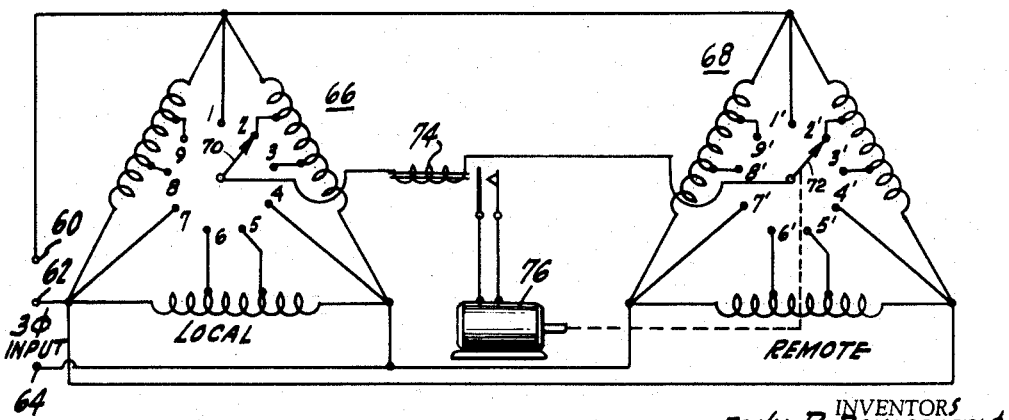
Fig.3.
INVENTORS
JOHN R. BONACCORSI &
ROLAND J. WHITE
BY
*J. L. Whittaker*
ATTORNEY INVENTORS
JOHN R. BONACCORSI
ROLAND J. WHITE
BY J. L. Whittaker
ATTORNEY

United States Patent Office 2,944,202
Patented July 5, 1960

2,944,202

MULTI-PHASE SERVO SYSTEM

John R. Bonaccorsi, Philadelphia, Pa., and Roland J. White, Westmont, N.J., assignors to Radio Corporation of America, a corporation of Delaware Filed Jan. 22, 1959, Ser. No. 788,464

8 Claims. (Cl. 318—29)

The present invention relates to a new and improved bridge-type servo system.

A conventional, direct-voltage bridge-type servo system includes a pair of potentiometers, one at a local location and the other at a remote location. They are normally of the same value and each has the same number of taps. A controller element, which may be a handwheel or the like, is coupled to the slider of one potentiometer. The controlled element or load is coupled to the slider of the other potentiometer. When the sliders tap off different voltages, the circuit to a motor closes and the latter drives the load into positional correspondence with the handwheel. At that time, the local and remote voltages are equal and the motor circuit opens.

The system described above and corresponding single phase A.C. bridge systems have limitations. The minimum voltage between taps which can be used must be greater than the voltage sensitivity of the sensing means. If it is not, the load will not always be driven into correspondence with the handwheel. Thus, the number of taps for a given voltage across the potentiometer is limited, whereby the positional accuracy of the system is limited. The number of taps and system accuracy can be increased by increasing the voltage across the potentiometer. But, since the sensing device must be capable of withstanding the full potentiometer voltage, there is a limit to the amount the voltage can be increased.

The degree of merit of a bridge system, such as described above, may be expressed as a fraction $$\frac{V_u}{V_m} \text{ or } \frac{V_s}{V_m}$$

where:

$V_u$=the voltage between adjacent taps
$V_m$=the maximum bridge voltage
$V_s$=the minimum voltage required to actuate the sensing means The larger the figure of merit, the greater the degree of merit of the servo system. In a typical system employing 10 taps, the figure of merit may be 1/9. In a practical direct current servo system, the figure of merit may be less than 1/9.

An object of the present invention is to provide a bridge-type servo system having a figure of merit which is much larger than that of the system described above.

Another object of the invention is to provide a bridge-type servo system of increased sensitivity and increased reliability without requiring the use of additional amplifiers or the like.

The servo system of the present invention includes a pair of like, multiple phase bridges, both connected in the same manner to a source of multiple phase power. A slider means engaged with each bridge receives a voltage the amplitude and phase angle of which depend upon the position of that slider means. The difference in phase angle and amplitude between the slider means voltages is sensed and, when either or both are different, one of the slider means is moved with respect to the other an amount sufficient to reduce these differences to zero.

One advantage of this system over either D.C. or single phase A.C. bridge-type servo systems is that two parameters are sensed, one voltage amplitude and the other voltage phase angle. As will be explained in greater detail below, systems of this type can have a much larger number of taps for the same line voltage than the prior art system described and thus a much larger figure of merit. For example, using the same sensing means as previously described, a ten tap discrete position servo system can be built using a three-phase bridge with a figure of merit of 1/4, 1/3, or even 1/2.

In some forms of the present invention, the sensing means may be of the single phase type such as a relay or the like. In this case, the drive means moves the remote slider in one direction only. However, in an improved form of the invention, the sensing and drive means can comprise a multiple phase motor. Here, the motor can drive in either direction and will move the remote slider to the correct position via the shortest possible route.

The invention will be described in greater detail by reference to the following description taken in connection with the accompanying drawing in which:

Fig. 1 is a block and schematic diagram of a prior art servo system;

Fig. 2 is a block circuit diagram of the present invention;

Fig. 3 is a block and schematic circuit diagram of a form of the invention using three phase delta bridges;

Similar reference characters are applied to similar elements in the drawings.

Figure 4:
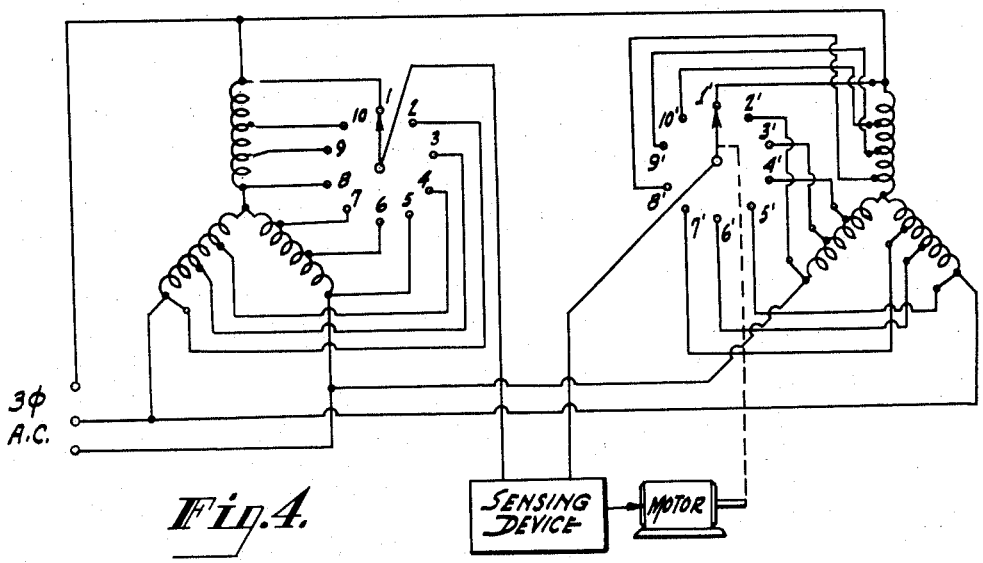
Fig. 4 is a block and schematic circuit diagram of a form of the invention using three phase Y bridges.

A known, direct voltage, bridge-type servo system is shown in Fig. 1. It includes a pair of potentiometers 20 and 22, one at a local location and the other at a remote location. They are of the same value and each has the same plurality of taps—10 in the embodiment shown. These are legended 1–10 at the local location and 1'–10' at the remote location and are normally arranged in a circle. When the sliders 24 and 26 produce the same voltages, the sensing means, a relay 28, is not actuated. However, when the sliders tap off different voltages, the relay is actuated and the circuit to motor 30 closes. The motor then drives the remote slider 26 until it is at the same tap as the local slider 24. The load 32 is also driven by the motor.

The invention is illustrated generically in Fig. 2. The arrangement includes two multiple phase bridges 40 and 42, one at the local location and the other at the remote location. For example, one bridge may be at the pilot's position of an aircraft and the other at the equipment position which may be, for example, near the tail of the aircraft. A multiple phase power source 44 delivers power to the two bridges via multi-conductor cables 46 and 48. Normally, the multiple phase source will be a three phase source, however, the invention is not limited to three-phase operation. The sensing device 50 which is connected between the bridges 40 and 42 senses the voltage amplitude and phase angle at the sliders of the two bridges and, when they are different, produces a control signal at lead 52. The latter is applied to a drive means 54 which positions the slider of bridge 42 to a point at which the voltage thereat is equal in both amplitude and phase angle to the voltage output of bridge 40. The load driven may be on the same shaft as the slider and may consist of the tuning control for a transmitter or receiver, for example. The load is illustrated schematically by block 56. The controlling member may be a handwheel such as is shown at 58 connected to the slider of bridge 40.

Fig. 3 shows one typical system according to the invention. The power supply is a three-phase supply and it applies appropriate voltages to terminals 60, 62, and 64. The local and remote bridges 66 and 68 are delta-connected bridges. There are nine equally spaced taps at each bridge, any one of which may be engaged by a slider. When the sliders 70, 72 engage different taps, relay 74 is energized and the circuit to motor 76 is closed. The latter drives the remote slider 72 to the same position as the local slider 70.

The figure of merit of the bridge of Fig. 3 is $$\frac{\frac{V_m}{3}}{V_m} = \frac{1}{3}$$

Thus, the performance of the bridge of Fig. 3 should exceed that of the bridge of Fig. 1 by a factor of 3.

It should be noted that the voltage amplitude between taps 1 and 2, for example, is exactly the same as the voltage amplitude between taps 1 and 9. One might therefore instinctively believe that if slider 70 were at tap 2 and slider 72 at tap 9' there would be no voltage across relay 74 and the latter would not be actuated. But, this is not the case. The two voltages are at different phase angles and produce a rather large resultant voltage across relay 74 so that the latter is energized.

The servo system of Fig. 4 includes Y connected bridges rather than delta connected bridges. The operation is similar to that described for the arrangement of Fig. 3 and need not be discussed in detail. The figure of merit for the Y connected system, which is a 10 position system, is $$\frac{\frac{V}{3}}{V\sqrt{3}} = \frac{1}{5.2}$$

where $V$ = the voltage across one leg of the Y.

Figure 5:
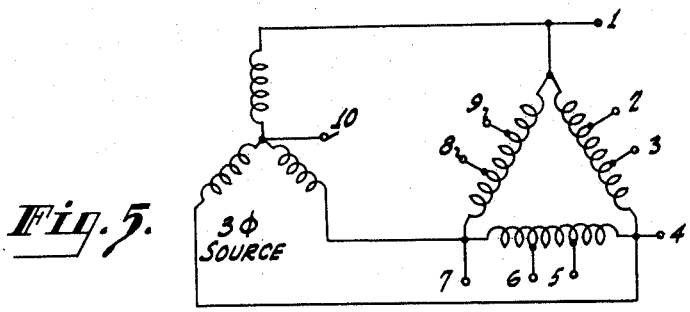
Fig. 5 is a schematic diagram of a portion of a bridge-type servo system employing a combined Y and delta bridge.

Fig. 5 illustrates one of the two bridges required in another form of servo system according to the invention. The second one is identical. In this arrangement, the bridge consists of a combined Y and delta connected bridge. The figure of merit for this arrangement is 1/3.

Figure 6:
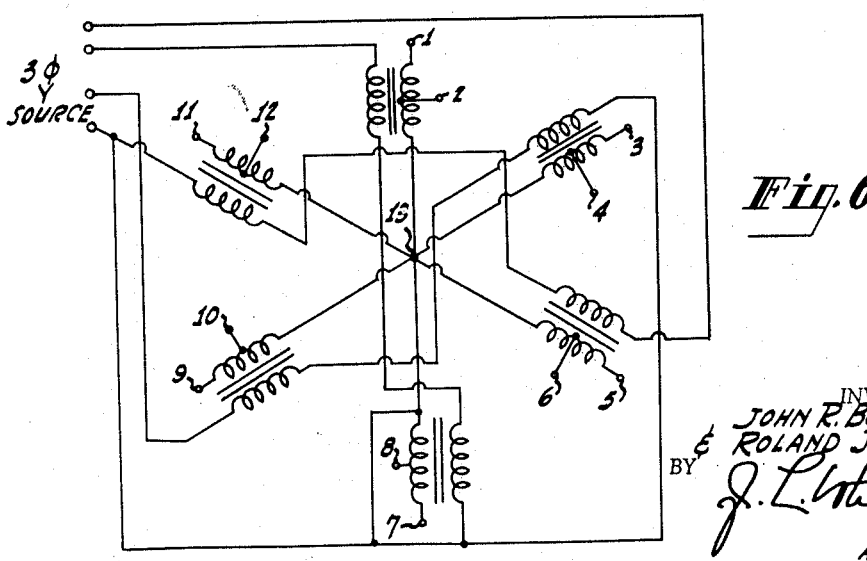
Fig. 6 is a schematic circuit diagram of another type of bridge circuit which may be used in the present invention.

A more complex bridge arrangement is shown in Fig. 6. Here too, only one of the two bridges is shown. The other one is identical and is similarly connected to the three phase Y source. The sensing means here and in the circuit of Fig. 5 may be identical to the sensing means shown in Fig. 3. It can be shown that the figure of merit of the system of Fig. 6 is 1/2.

Figure 7:
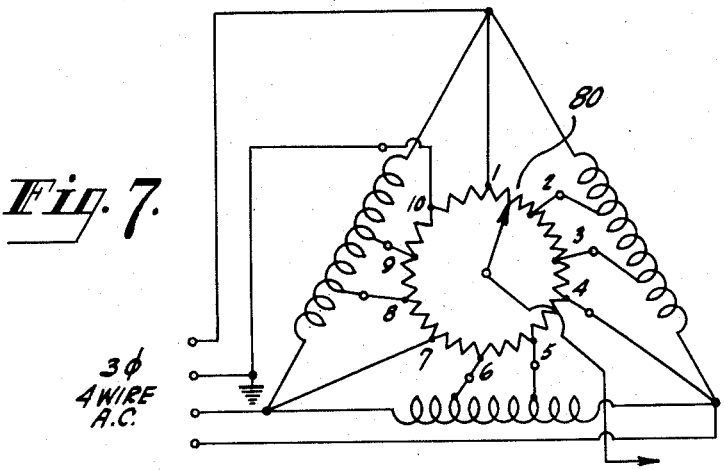
Fig. 7 is a schematic circuit diagram of a bridge from which a continuous voltage may be tapped which is useful in the present invention.

The arrangements which have been discussed so far are all discrete position servo systems. Fig. 7 illustrates the bridge of a continuous servo system. A potentiometer 80 is connected to the taps on the bridge so that a continuous voltage develops across it. The accuracy of this arrangement depends, of course, on the sensitivity of the sensing means. The resistance between taps does affect the figure of merit adversely but the total impedance in series with the sensing element will be much smaller than that of Fig. 1.

More complex Y and combined bridges may also be used with a potentiometer by interconnecting them in a sequence that keeps the voltage drop between potentiometer taps at a reasonably constant and small level.

Figure 8:
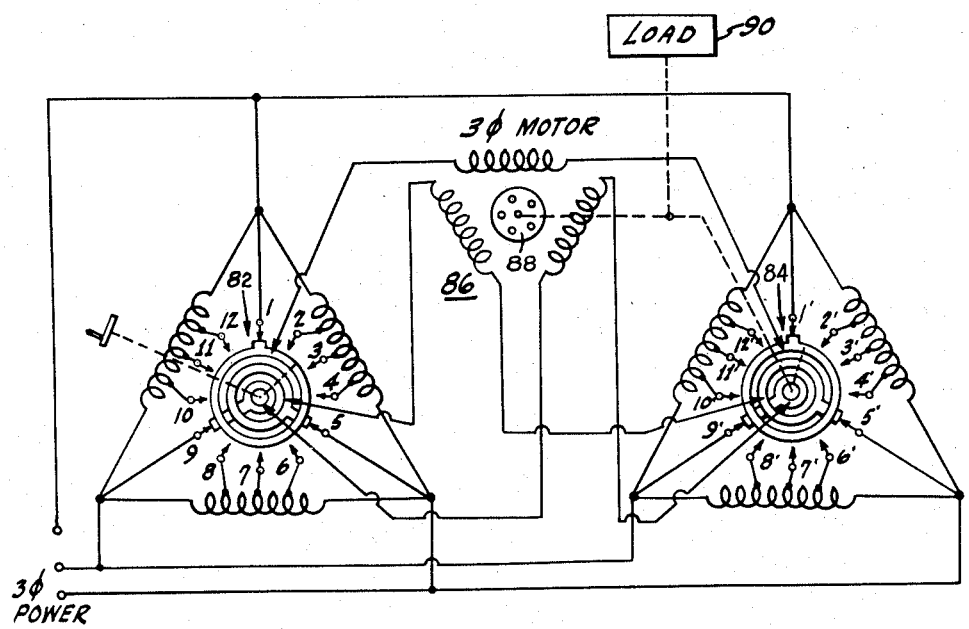
Fig. 8 is a schematic circuit diagram of a bridge-type servo system according to the present invention in which the drive means is multiple phase and can drive the load in either direction.

A multiple-phase bridge may also use a compatible, multiple-phase motor as a combined sensing and actuating element. An arrangement of this type is shown in Fig. 8. Here, the sliders 82 and 84 respectively each consist of three spaced conductive sections. These sections are mechanically interconnected and rotate together as a unit. Each section engages a different tap on its bridge so that each slider means 82 and 84 receives a three-phase voltage. Three-phase motor 86 includes three stator windings, each winding connected between a section of one slider means 82 and a corresponding section of the other slider means 84. Thus, when the voltages sensed by the two slider means are of the same phase, motor 86 is not energized but when they are of different phase, the motor is energized. The rotor 88 is connected to the remote slider means 84 and the load 90 and it drives until slider means 82 and 84 are in phase correspondence. An important advantage of this arrangement is that the motor will drive via the shortest possible route to the correct position.

What is claimed is:

1. A positioning system comprising, in combination, connections for a multiple phase source; a pair of like multiple phase bridges, one at one location and the other at another location, both connected in the same manner to said connections; a control element for each bridge which can be positioned to tap off different voltages from said bridges; a sensing circuit connected between said two control elements and responsive to at least one of a difference in voltage amplitude and phase angle between the voltages tapped from the two bridges; and a drive means responsive to said sensing circuit for moving the control element of one of the bridges in a direction and amount such that the voltages tapped from the two bridges are equal in amplitude and phase angle.

2. A servo system comprising, in combination, connections for a multiple phase power source; a pair of like, multiple phase bridges, both connected in the same manner to said connections; slider means engaged with each bridge, each for receiving a voltage from its bridge; sensing means connected to both of said slider means for producing an error signal in response to an unbalance in the voltages it receives; and drive means responsive to said error signal for driving one of said slider means with respect to the other an amount sufficient to balance said voltages.

3. A positioning system comprising, in combination, connections for a multiple phase power source; a pair of like multiple phase bridges, both connected in like manner to said connections; slider means engaged with each bridge and each receiving a voltage the amplitude and phase angle of which depend upon the position of that slider means; and means connected to both slider means for sensing a difference in phase angle and amplitude between the voltages received from said two slider means and, in response to said difference, moving one of said slider means with respect to the other an amount sufficient to reduce said difference to zero.

4. In the positioning system as set forth in claim 3, each said slider means being connected to receive a single phase voltage, and said last-named means comprising a relay, and a motor which is rendered operative in response to actuation of said relay.

5. In the positioning system as set forth in claim 3, each said slider means being connected to receive a multiple phase voltage, and said last-named means comprising a multiple phase motor.

6. A discrete position servo system comprising, in combination, connections for a multiple phase power source; a pair of like, multiple phase bridges, both connected in the same manner to said connections, each said bridge having the same plurality of taps thereon at which discrete voltages appear; a pair of slider means, each engageable with the taps on one bridge for receiving a discrete voltage the amplitude and phase angle of which depend upon the tap engaged; sensing means connected to both of said slider means for producing an error signal in response to an unbalance in the voltages received from said slider means; and drive means responsive to said error signal for driving one of said driver means with respect to the other an amount sufficient to balance said voltages.

7. A servo system as set forth in claim 6 wherein said connections comprise connections for a three-phase power source, and said bridges each comprise a delta connected three-phase bridge.

8. A servo system as set forth in claim 6 wherein said connections comprise connections for a three-phase power source and said multiple phase bridges comprise Y connected three-phase bridges.

No references cited.